United States Patent Office 2,765,254
Patented Oct. 2, 1956

2,765,254

CONTROL OF FUNGUS ON APPLE TREES WITH MANGANOUS DIMETHYL DITHIOCARBAMATE

Albert A. Somerville, Carmel, N. Y., assignor to R. T. Vanderbilt Company, Inc., New York, N. Y., a corporation of New York No Drawing. Application August 7, 1952,
Serial No. 303,148

2 Claims. (Cl. 167—22)

My invention relates to a new chemical compound which is particularly adapted for use in the control of scab on apple trees.

In the growing of apples it is frequently necessary to use some means for controlling the scab which will otherwise develop. Ferric dimethyl dithiocarbamate is a salt which has heretofore been used for that purpose but, although it is an effective fungicide, its use has not proved to be entirely satisfactory. Thus, the ferric salt is dark black in color and leaves an unsightly residue on the fruit, which interferes with the development of color in the ripening fruit. Furthermore, the ferric salt stimulates a dark green color in the foliage which physiologically interferes with the ripening process of the fruit. Zinc dimethyl dithiocarbamate, another well known fungicide of the class composed of heavy metal dimethyl dithiocarbamates, cannot be used for the control of scab on apple trees since most apple trees are harmed by zinc.

In accordance with my invention I have prepared a new heavy metal dimethyl dithiocarbamate which is particularly adapted for use in the control of scab on apple trees, that carbamate being manganous dimethyl dithiocarbamate. Thus, the compound which I have invented is light tan in color and does not leave an unsightly residue on the foliage and fruit. At the same time, the foliage on apple trees which are sprayed with the manganous dimethyl dithiocarbamate develops only the light green color which allows normal ripening of the fruit. When manganous dimethyl dithiocarbamate is used for the control of apple scab, the control obtained is excellent and equal to that obtained when ferric dimethyl dithiocarbamate is used.

Example I

In order to prepare manganous dimethyl dithiocarbamate, the following procedure was used.

950 gallons of water at 60° C. was added to a 3800 gallon wooden tank equipped with an agitator. To this was added 416 pounds of $MnSO_4.H_2O$ which dissolved immediately under agitation, and then 2325 pounds of a 30 per cent by weight aqueous solution of sodium dimethyl dithiocarbamate was run in with agitation over a period of one hour. The tank was then filled with cold water and allowed to settle for approximately eight hours. The supernatant liquid was then decanted and replaced with an equal amount of water. The mixture was then agitated and allowed to settle, after which the supernatant liquid was again decanted. This washing procedure was repeated twice more in order to bring the soluble salts down to less than 0.25 percent by weight, based upon the final dry product. The sludge was then pumped to a tank having a porous bottom covered by a filter cloth and was sucked as dry as possible using 8 to 10 inches of mercury vacuum. Thereafter, the filter cake was dried on trays at 150° F. Exposure to air of the wet, incompletely washed filter cake should be avoided, or otherwise various side reactions take place which darken the product badly.

Example II

This example illustrates the preparation of a composition which is an effective fungicide when used in the control of scab on apple trees and which is composed predominantly of manganous dimethyl dithiocarbamate.

950 gallons of water at 60° C. was added to a 3800 gallon wooden tank equipped with an agitator. To this was added 415 pounds of $MnSO_4.H_2O$ which dissolved immediately under agitation, and then 2325 pounds of a 30 percent aqueous solution containing a mixture of sodium dimethyl dithiocarbamate and the sodium salt of 2-mercaptobenzothiazole in the weight ratio of 91.9:8.1. This aqueous solution was run in with agitation over a period of one hour. The tank was then filled with cold water and allowed to settle for approximately eight hours. The supernatant liquid was decanted, and the sludge remaining in the tank was washed three times with water which was removed by decantation to bring the soluble salts down to less than 0.25 percent, based upon the weight of the final dry product. The sludge was then pumped to a tank having a porous bottom covered by a filter cloth and was sucked as dry as possible using a vacuum of 8 to 10 inches of mercury. The final product was prepared by drying on trays at 150° F. Here again, if the wet, incompletely washed filter cake is exposed to air various side reactions take place which darken the product badly.

In the control of scab on apple trees, manganous dimethyl dithiocarbamate can be used in the form of a wettable powder prepared in accordance with the procedures conventionally used in the fungicide art. A suitable wettable powder is composed, for example, of 75 percent by weight of manganous dimethyl dithiocarbamate, 17 percent by weight of clay, 5 percent by weight of Silene EF (a proprietary product, being a white, extremely finely divided, precipitated, hydrated calcium silicate), 1 percent by weight of Darvan No. 1 (a proprietary product, being the sodium salt of polymerized polyaryl sulfonic acids) and 2 percent by weight of sodium dodecyl benzene sulfonate. The preferred method of application involves spraying with a mixture composed of 2 pounds of the wettable powder and 100 gallons of water. The spray is applied once each week or ten days, depending upon weather and disease conditions.

Reference is made to the copending application of Charles E. Bradley, Jr., Serial No. 303,168, filed of even date herewith which is directed to a method for the preparation of manganous dimethyl dithiocarbamate.

I claim:

1. In the control of scab on apple trees, the step of spraying the trees with manganous dimethyl dithiocarbamite in amount sufficient to inhibit the development of scab.

2. In the control on apple trees of fungus diseases of the fruit and foliage, the step of applying to the trees manganous dimethyl dithiocarbamate in an amount sufficient to control fungus attack on the trees.

References Cited in the file of this patent

UNITED STATES PATENTS

| | | |
|---|---|---|
| 2,286,738 | Hill | June 16, 1942 |
| 2,567,358 | Waletzky | Sept. 11, 1951 |

OTHER REFERENCES

Goldsworth et al.: Chemical Abstracts, vol. 37, p. 55444 (1943.)

C. A. vol. 43, p. 10256 (index), Entry under dimethyl-dithiocarbamic acid. (See Plant Disease Reptr. Suppl. 183, pp. 11–77 (1949.)

Hurt: Proc. Virginia State Hort. Soc. 51st Ann. Meeting, pp. 42–7 (1946), Dept. Ag.

Powell: Trans. Ill. State Hort. Soc. Proc. 73rd Ann. Meeting Hort. Soc. Central Ill., pp. 305–12 (1944), Dept. Ag.